United States Patent
Jing et al.

(10) Patent No.: US 10,134,553 B2
(45) Date of Patent: Nov. 20, 2018

(54) CONTACT ARMS FOR USE IN ELECTRICAL SWITCHGEAR AND METHODS OF FABRICATING SAME

(71) Applicant: ABB Schweiz AG, Baden (CH)

(72) Inventors: Beibei Jing, Shanghai (CN); Zongfeng Ye, Shanghai (CN); Qiyou Xu, Shanghai (CN)

(73) Assignee: ABB Schweiz AG, Baden (CH)

( * ) Notice: Subject to any disclaimer, the term of this patent is extended or adjusted under 35 U.S.C. 154(b) by 212 days.

(21) Appl. No.: 14/972,486

(22) Filed: Dec. 17, 2015

(65) Prior Publication Data

US 2016/0181044 A1  Jun. 23, 2016

(30) Foreign Application Priority Data

Dec. 18, 2014  (CN) .......................... 2014 1 0799900

(51) Int. Cl.
  *H01H 71/08*  (2006.01)
  *H01H 69/00*  (2006.01)

(52) U.S. Cl.
  CPC ............ *H01H 71/08* (2013.01); *H01H 69/00* (2013.01)

(58) Field of Classification Search
  CPC ........ H01H 71/08; H01H 69/00; H01H 9/342; H01H 1/58; H01H 1/5855; H01H 71/123; H01H 2009/523; H01H 33/04; H01H 9/52
  USPC .......... 200/275, 279, 289, 304–306; 29/622; 218/134, 156
  See application file for complete search history.

(56) References Cited

U.S. PATENT DOCUMENTS

| 2,743,338 | A | * | 4/1956 | Graybill | ................... | H01H 1/14 |
|           |   |   |        |          |                     | 200/243   |
| 3,764,765 | A |   | 10/1973 | Olashaw |                     |           |
| 3,958,095 | A | * | 5/1976 | Zaffrann | ................... | H01H 9/36 |
|           |   |   |        |          |                     | 200/293   |
| 4,251,700 | A | * | 2/1981 | Zaffrann | ................ | H01H 21/54 |
|           |   |   |        |          |                     | 200/260   |
| 4,549,242 | A |   | 10/1985 | Nebon et al. |                 |           |
| 4,639,564 | A |   | 1/1987 | Grunert et al. |                |           |
| 4,931,602 | A | * | 6/1990 | Toda     | ................... | H01H 71/1009 |
|           |   |   |        |          |                     | 218/153   |
| 6,043,978 | A |   | 3/2000 | Mody et al. |                 |           |

(Continued)

FOREIGN PATENT DOCUMENTS

CN  2405417 Y  11/2000
CN  201270284 Y  7/2009

(Continued)

OTHER PUBLICATIONS

"Liyond Contact Arm Series", Yueqing Liyond Electric Co Ltd, pp. 23-29, 2013.

(Continued)

*Primary Examiner* — Edwin A. Leon
(74) *Attorney, Agent, or Firm* — Barnes & Thornburg LLP (57) ABSTRACT

A contact arm for use in a circuit breaker is provided. The contact arm includes a tubular body that includes a conductive tube and defines a central longitudinal axis of the contact arm. The body has a first end configured for connection with a contact of the circuit breaker, and a second end configured for connection with a pole of the circuit breaker. The body defines a plurality of apertures extending therethrough from an outer surface of the body to an inner surface of the body.

21 Claims, 6 Drawing Sheets

(56) References Cited

U.S. PATENT DOCUMENTS

2013/0075238 A1 3/2013 Fischer-Carne et al.
2014/0138357 A1 5/2014 Kasza et al.

FOREIGN PATENT DOCUMENTS

| CN | 201374256 Y | 12/2009 |
| CN | 201435311 Y | 3/2010 |
| CN | 202153498 U | 2/2012 |
| CN | 202275776 U | 6/2012 |
| CN | 202959367 U | 6/2013 |
| CN | 102399913 B | 5/2014 |
| CN | 203590492 U | 5/2014 |
| CN | 103968288 A | 8/2014 |
| CN | 203813284 U | 9/2014 |
| CN | 204012345 U | 12/2014 |
| CN | 204045417 U | 12/2014 |
| CN | 204348595 U | 5/2015 |
| EP | 1471553 B1 | 5/2006 |
| WO | 03065396 A1 | 8/2003 |
| WO | 2012142739 A1 | 10/2012 |

OTHER PUBLICATIONS

Machine Translation and First Office Action and Search issued in connection with corresponding CN Application No. 201410799900.7 dated Jul. 17, 2017.
Unofficial Translation and second Office Action issued in connection with corresponding CN Application No. 201410799900.7 dated Dec. 25, 2017.
Unofficial Translation and Third Office Action issue in connection with corresponding CN Application No. 20140799900.7 dated Aug. 7, 2018.

\* cited by examiner

PRIOR ART

CONTACT ARMS FOR USE IN ELECTRICAL SWITCHGEAR AND METHODS OF FABRICATING SAME

BACKGROUND

The field of the disclosure relates generally to electrical switchgear and, more particularly, to contact arms for use in electrical switchgear and methods of fabricating such contact arms.

Electrical systems, such as power generation, power transmission, power distribution, and power conversion systems, often include switchgear used to control, protect, and/or isolate electrical equipment within the electrical system. Switchgear generally includes a combination of bus bars, electrical cables, circuit breakers, electrical switches, and/or fuses electrically connected in a desired manner to control, protect, and/or isolate the electrical equipment of electrical systems. Circuit breakers generally include contact arms and a trip mechanism electrically coupled in series between the contact arms. Contact arms in circuit breakers are used to provide electrical connections between the circuit breaker and various components of switchgear.

In use, high currents passing through circuit breaker contact arms can cause significant heat generation. Such heat generation, if not controlled, may cause excessive heating of contact arms, which can adversely affect the performance and/or integrity of the contact arm.

Several attempts have been made to improve the heat dissipation performance of circuit breaker contact arms. For example, some known contact arms utilize annular fins disposed on an outer surface of the contact arm to increase the surface area and, consequently, the heat dissipation surface of the contact arm. Despite these attempted solutions, a continuing need exists for contact arms having improved heat dissipation performance.

BRIEF DESCRIPTION

In one aspect, a contact arm for use in a circuit breaker is provided. The contact arm includes a tubular body that includes a conductive tube and defines a central longitudinal axis of the contact arm. The body has a first end configured for connection with a contact of the circuit breaker, and a second end configured for connection with a pole of the circuit breaker. The body defines a plurality of apertures extending therethrough from an outer surface of the body to an inner surface of the body.

In another aspect, a circuit breaker for use in a switchgear device is provided. The circuit breaker includes a pole, a first contact arm, and a second contact arm. The first contact arm is electrically coupled to the pole at a first end of the first contact arm, and has a second end electrically coupled to a first contact of the circuit breaker. The second contact arm is electrically coupled to the pole at a first end of the second contact arm, and has a second end electrically coupled to a second contact of the circuit breaker. At least one of the first contact arm and the second contact arm includes a tubular body that includes a conductive tube and defines a central longitudinal axis of the respective contact arm. The body defines a plurality of apertures extending therethrough from an outer surface of the body to an inner surface of the body.

In yet another aspect, a method of fabricating a contact arm for use in a switchgear circuit breaker is provided. The method includes providing a tubular body that includes a conductive tube and defines a central longitudinal axis of the contact arm, and forming a plurality of apertures in the tubular body extending from an outer surface of the body to an inner surface of the body.

DETAILED DESCRIPTION

The systems, method, and apparatus described herein facilitate dissipating heat generated within circuit breakers of electrical switchgear. In particular, the systems, method, and apparatus described herein utilize circuit breaker contact arms having a plurality of apertures extending from an outer surface of the contact arm to an inner surface of the contact arm. The apertures facilitate air flow within and around the contact arm, and thereby facilitate dissipation of thermal energy generated by the contact arm. In some embodiments, the apertures are arranged helically about a central longitudinal axis of the contact arm. Without being bound by any particular theory, it is believed that the helical arrangement of the apertures facilities dissipation of thermal energy generated by contact arms by creating a whirlwind or vortex air flow effect between an interior of the contact arm and an exterior of the contact arm, thereby enhancing heat transfer between the interior of the contact arm and the exterior of the contact arm.

Figure 1:
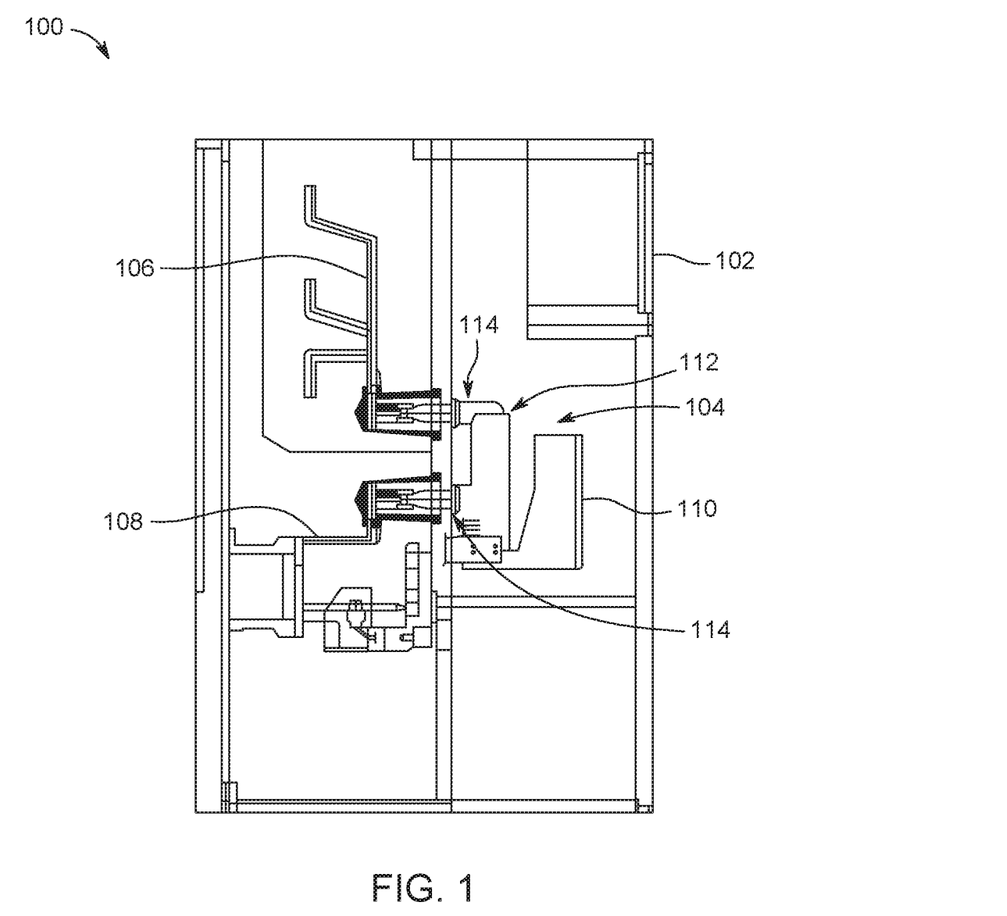
FIG. 1 is a schematic view of an exemplary switchgear unit including a circuit breaker.

FIG. 1 is a schematic view of an exemplary switchgear device 100 including a housing 102, a circuit breaker 104, a bus bar 106, and a conductive cable 108. Components of switchgear device 100, such as circuit breaker 104, bus bar 106, and conductive cable 108, may be disposed in separate compartments of housing 102 that are separated from one another by partitions (e.g., steel partitions).

Circuit breaker 104 is configured to control power to one or more loads (not shown), and to interrupt current flow to a load when a short or fault is detected. Loads may include, for example and without limitation, machinery, motors, lighting, and/or other electrical and mechanical equipment of a manufacturing facility, a power generation facility, or a power distribution facility. Circuit breaker 104 is coupled to a power supply (not shown) via bus bar 106, and is coupled to one or more loads via conductive cable 108.

Figure 2:
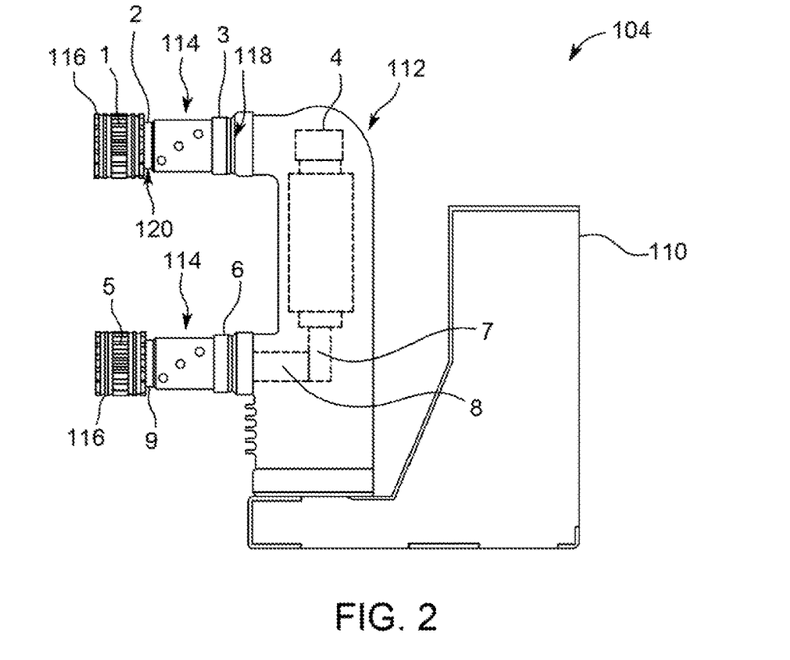
FIG. 2 is a schematic view of the circuit breaker of FIG. 1.

FIG. 2 is a schematic view of circuit breaker 104. With additional reference to FIG. 2, circuit breaker 104 includes a case body 110, a plurality of circuit breaker poles 112, a plurality of contact arms 114, and a plurality of contacts 116 each associated with one of contact arms 114. In the exemplary embodiment, circuit breaker 104 is a medium or high voltage three-phase circuit breaker having a voltage rating of 3 kilovolts (kV). In other embodiments, circuit breaker 104 may be a circuit breaker other than a medium or high voltage three-phase circuit breaker, and have a voltage rating greater than or less than 3 kV.

As shown in FIG. 2, each pole 112 is coupled to case body 110. The exemplary embodiment includes three poles 112, only one of which is shown in FIG. 2, and six contact arms 114, only two of which are shown in FIG. 2. Each pole 112 corresponds to one of three electrical phases at which power is supplied to switchgear device 100, and each pole 112 is electrically coupled to two contact arms 114. In other embodiments, circuit breaker 104 may include fewer than three poles 112 or more than three poles 112, and/or fewer than six contact arms 114 or more than six contact arms 114.

Each contact arm 114 includes a first end 118 electrically coupled to circuit breaker pole 112, and a second end 120 electrically coupled to a corresponding contact 116. In the exemplary embodiment, contacts 116 are cluster contacts, although contacts 116 may be any suitable circuit breaker contact that enables switchgear device 100 to function as described herein.

Contact arms 114 provide electrical communication between circuit breaker pole 112 and another component of switchgear device 100 (shown in FIG. 1), such as bus bar 106 or conductive cable 108. In the exemplary embodiment, one of the illustrated contact arms 114 is electrically coupled to bus bar 106, and the other illustrated contact arm 114 is electrically coupled to conductive cable 108. Each pole 112 includes a trip mechanism configured to interrupt an electrical connection between a pair of contact arms 114 coupled to the respective pole 112 when a fault or short is detected.

In use, contact arms 114 can generate a significant amount of heat from carrying current between different components of switchgear and/or other components of an electrical system in which switchgear device 100 is installed. Such heat, if not dissipated, can adversely affect the performance and/or integrity of contact arms 114.

Figure 3:
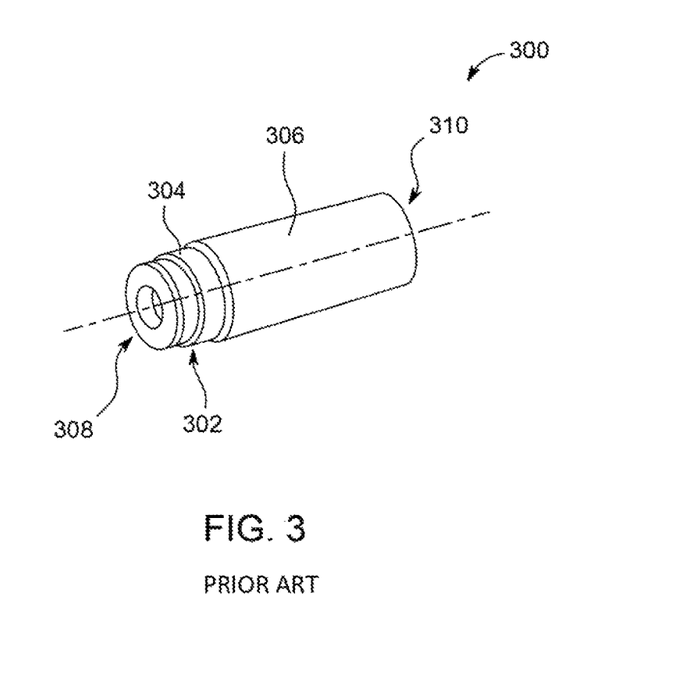
FIG. 3 is a perspective view of a circuit breaker contact arm as known in the prior art.

FIG. 3 is a perspective view of a contact arm 300 as known in the prior art. Contact arm 300 includes a tubular body 302 including a conductive tube 304 and an insulating layer 306 providing electrical insulation around conductive tube 304. Contact arm 300 includes a first end 308 adapted for connection to a conductive contact, such as contacts 116 (shown in FIG. 2), and a second end 310 adapted for connection to a circuit breaker pole, such as circuit breaker pole 112 (shown in FIG. 1). As shown in FIG. 3, body 302 of contact arm 300 is free of heat dissipation elements, such as holes, slots, fins, or rings.

Figure 4:
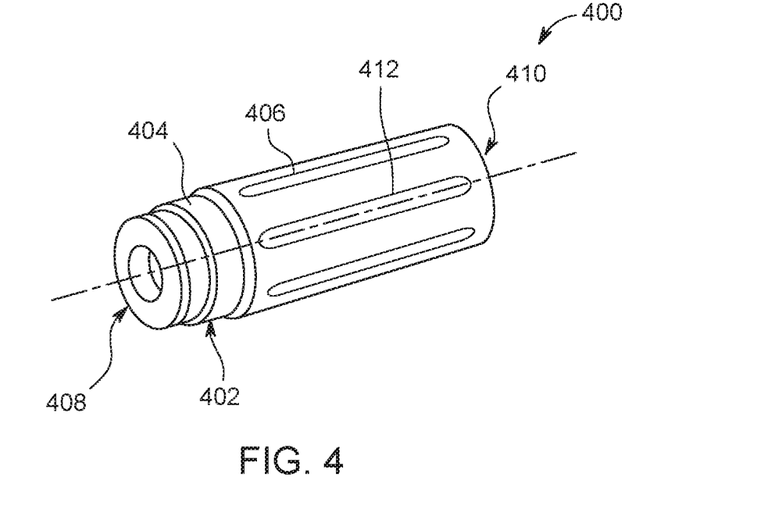
FIG. 4 is a perspective view of one embodiment of a circuit breaker contact arm suitable for use in the circuit breaker and switchgear unit of FIGS. 1 and 2.
Figure 5:
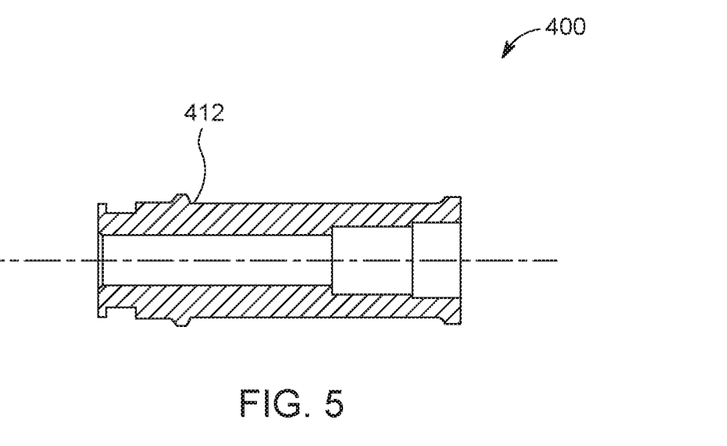
FIG. 5 is a cross-section of the contact arm of FIG. 4.

FIG. 4 is a perspective view of one embodiment of a contact arm 400 suitable for use with circuit breaker 104 (shown in FIGS. 1 and 2) and switchgear device 100 (shown in FIG. 1). FIG. 5 is a cross-section of contact arm 400. As shown in FIGS. 4 and 5, contact arm 400 includes a tubular body 402 including a conductive tube 404 and an insulating layer 406 providing electrical insulation around conductive tube 404. Contact arm 400 includes a first end 408 adapted for connection to a conductive contact, such as contacts 116 (shown in FIG. 2), and a second end 410 adapted for connection to a circuit breaker pole, such as circuit breaker pole 112 (shown in FIG. 2). As shown in FIGS. 4 and 5, tubular body 402 defines a plurality of elongate slots 412 along an outer surface of tubular body 402.

Figure 6:
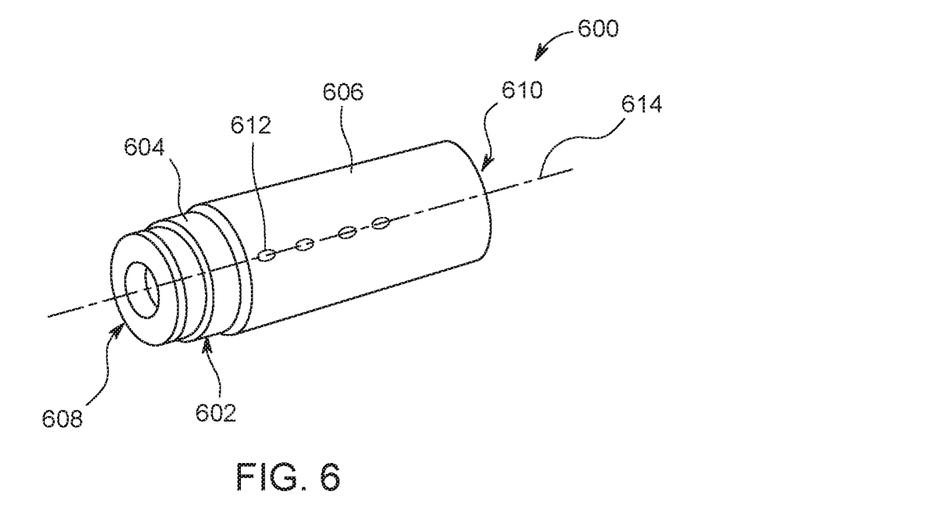
FIG. 6 is a perspective view of another embodiment of a circuit breaker contact arm suitable for use in the circuit breaker and switchgear unit of FIGS. 1 and 2.
Figure 7:
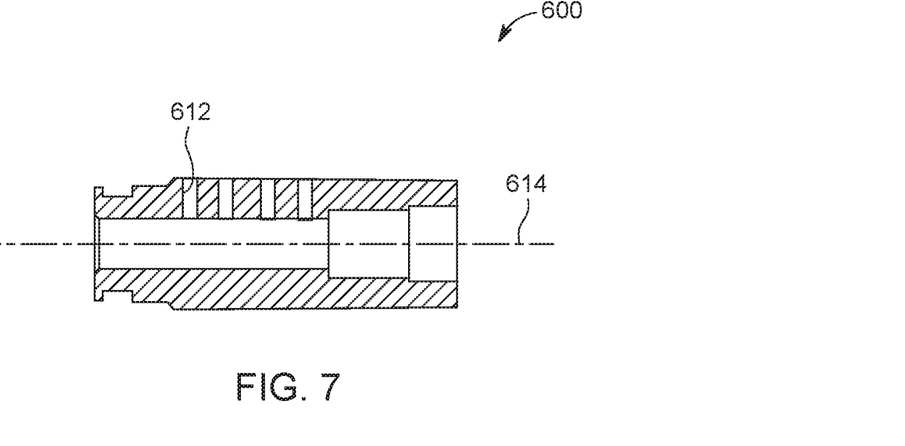
FIG. 7 is a cross-section of the contact arm of FIG. 6.

FIG. 6 is a perspective view of another embodiment of a contact arm 600 suitable for use with circuit breaker 104 (shown in FIGS. 1 and 2) and switchgear device 100 (shown in FIG. 1). FIG. 7 is a cross-section of contact arm 600. As shown in FIGS. 6 and 7, contact arm 600 includes a tubular body 602 including a conductive tube 604 and an insulating layer 606 providing electrical insulation around conductive tube 604. Contact arm 600 includes a first end 608 adapted for connection to a conductive contact, such as contacts 116 (shown in FIG. 2), and a second end 610 adapted for connection to a circuit breaker pole, such as circuit breaker pole 112 (shown in FIG. 2). As shown in FIGS. 6 and 7, contact arm 600 defines a plurality of apertures or through-holes 612 extending from an outer surface of body 602 to an inner surface of body 602. In the embodiment illustrated in FIGS. 6 and 7, apertures 612 are linearly aligned with one another, and are aligned with a longitudinal direction 614 of contact arm 600. The illustrated embodiment includes four apertures 612, although contact arm 600 may include more than or fewer than four apertures.

Figure 8:
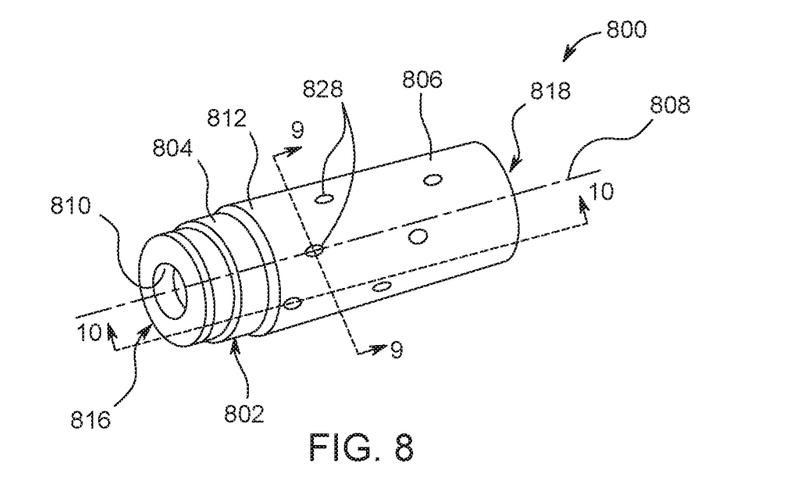
FIG. 8 is a perspective view of another embodiment of a circuit breaker contact arm suitable for use in the circuit breaker and switchgear unit of FIGS. 1 and 2.
Figure 9:
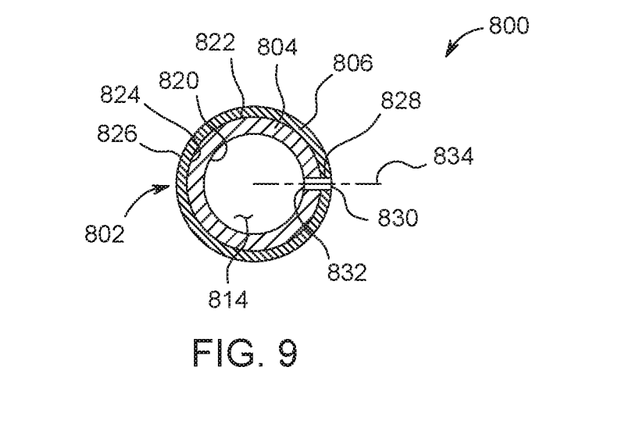
FIG. 9 is a cross-section of the contact arm of FIG. 8 taken along line 9-9 in FIG. 8.
Figure 10:
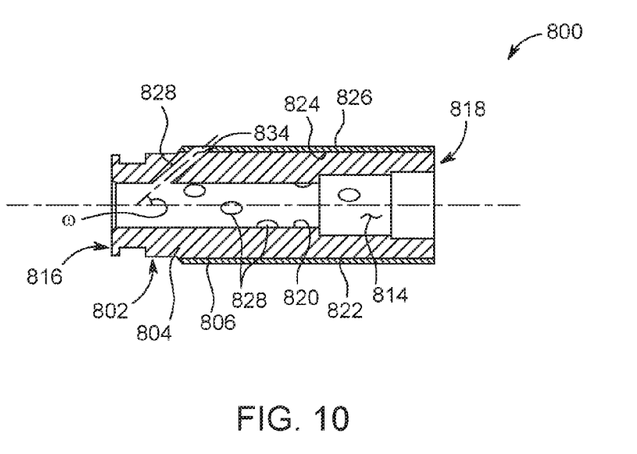
FIG. 10 is a cross-section of the contact arm of FIG. 8 taken along line 10-10 in FIG. 8.

FIG. 8 is a perspective view of another embodiment of a contact arm 800 suitable for use with circuit breaker 104 (shown in FIGS. 1 and 2) and switchgear device 100 (shown in FIG. 1). FIG. 9 is a cross-section of contact arm 800 taken along line 9-9 in FIG. 8, and FIG. 10 is a cross-section of contact arm 800 taken along line 10-10 in FIG. 8. In the exemplary embodiment, contact arm 800 includes a tubular body 802 including a conductive tube 804 and an insulating layer 806. Body 802 extends along and defines a central longitudinal axis 808 of contact arm 800. Each of conductive tube 804 and insulating layer 806 extends along and is concentric with central longitudinal axis 808. Body 802 also includes a radial inner surface 810 and a radial outer surface 812. Radial inner surface 810 defines a hollow interior 814 (shown in FIGS. 9 and 10) of contact arm 800, which is separated from an exterior of contact arm 800 by body 802.

Conductive tube 804 is configured to provide electrical communication between circuit breaker 104 (shown in FIGS. 1 and 2) and another component of switchgear device 100, such as bus bar 106 or conductive cable 108 (all shown in FIG. 1). Conductive tube 804 is suitably constructed from a conductive material. Suitable conductive materials from which conductive tube 804 may be constructed include, for example and without limitation, copper, aluminum, and combinations thereof. Conductive tube 804 includes a first end 816 adapted for connection to a conductive contact, such as contacts 116 (shown in FIG. 2), and a second end 818 adapted for connection to a circuit breaker pole, such as circuit breaker pole 112 (shown in FIG. 2). Conductive tube 804 also includes a radial inner surface 820 at least partially defining radial inner surface 810 of body 802, and a radial outer surface 822 in contact with insulating layer 806.

Insulating layer 806 encircles conductive tube 804, and encloses at least a portion of conductive tube 804 to provide electrical insulation between conductive tube 804 and other components of an electrical system in which contact arm 800 is installed. Insulating layer 806 is suitably constructed from an insulating material. Suitable insulating materials from which insulating layer 806 may be constructed include, for example and without limitation, thermoplastics. As shown in FIGS. 9 and 10, insulating layer 806 includes a radial inner surface 824 in contact with radial outer surface 822 of conductive tube 804, and a radial outer surface 826 that at least partially defines radial outer surface 812 of body 802 (shown in FIG. 8). In some embodiments, insulating layer 806 may be omitted from body 802.

As shown in FIGS. 8-10, contact arm 800 also includes a plurality of apertures 828 (also referred to herein as through-holes) configured to facilitate dissipation of thermal energy generated during use of contact arm 800. Specifically, body 802 defines apertures 828 that extend through body 802 from radial outer surface 812 of body 802 to radial inner surface 810 of body 802. Apertures 828 thereby provide air flow between the exterior of contact arm 800 and interior 814 of contact arm 800 to facilitate heat dissipation. Contact arm 800 may include any suitable number of apertures 828 that enables contact arm 800 to function as described herein. Six apertures 828 are shown in FIG. 8, although contact arm 800 may include fewer than six apertures (e.g., three apertures), or more than six apertures.

Apertures 828 are helically arranged about central longitudinal axis 808 of contact arm 800. That is, apertures 828 are disposed along a helical line centered about and extending along central longitudinal axis 808. Without being bound by any particular theory, it is believed that the helical arrangement of apertures 828 facilities dissipation of thermal energy generated by contact arm 800 by creating a whirlwind or vortex air flow effect between interior 814 of contact arm 800 and an exterior of contact arm 800, thereby enhancing heat transfer between interior 814 of contact arm 800 and the exterior of contact arm 800.

As shown in FIG. 9, each aperture 828 has a first opening 830 defined along radial outer surface 812 of body 802, and a second opening 832 defined along radial inner surface 810 of body 802. In the exemplary embodiment, first openings 830 and second openings 832 are both arranged helically about central longitudinal axis 808 of contact arm 800.

In the exemplary embodiment, each aperture 828 is cylindrically shaped, and each first opening 830 and each second opening 832 are elliptically shaped. Further, in the exemplary embodiment, each aperture 828 has substantially the same size and shape, and each first opening 830 and each second opening 832 have substantially the same size and shape. In other embodiments, one or more apertures 828 may be shaped other than cylindrically, and/or one or more of first openings 830 and/or second openings 832 may be shaped other than elliptically, such as rectangular, square, circular, rounded, oblong, triangular, or any other suitable shape that enables contact arm 800 to function as described herein.

As shown in FIGS. 9 and 10, each aperture 828 extends from radial outer surface 812 of body 802 to radial inner surface 810 of body 802 along a corresponding longitudinal axis 834. In the exemplary embodiment, each aperture 828 is oriented such that the corresponding longitudinal axis 834 of each aperture intersects central longitudinal axis 808 of contact arm 800. In other embodiments, one or more apertures 828 may be oriented such that the corresponding longitudinal axis 834 is offset or skewed with respect to central longitudinal axis 808 of contact arm 800. Further, in the exemplary embodiment, each aperture 828 is oriented at an oblique angle co with respect to central longitudinal axis 808. That is, each aperture 828 is oriented such that the corresponding longitudinal axis 834 of each aperture 828 forms an oblique angle co with central longitudinal axis 808. Apertures 828 may be oriented at any suitable angle that enables contact arm 800 to function as described herein. In some embodiments, for example, each aperture is oriented at angle co that is in the range of between about 30 degrees and about 60 degrees. In other suitable embodiments, angle co may be greater than about 60 degrees, or less than about 30 degrees. In some embodiments, for example, at least one aperture is oriented at an angle co of about 90 degrees. In some embodiments, at least one aperture 828 is oriented towards first end 816 such that the corresponding second opening 832 is positioned closer to first end 816 than the corresponding first opening 830 is. That is, at least one aperture 828 extends towards first end 816 of conductive tube 816 as the aperture extends from outer surface 812 to inner surface 810.

In the exemplary embodiment, apertures 828 are spaced uniformly along a helical line centered about and extending along central longitudinal axis 808. That is, each aperture 828 is spaced an equal distance from each adjacent aperture 828. In the exemplary embodiment, the axial spacing (i.e., the distance along central longitudinal axis 808) between each pair of adjacent apertures 828 is the same for each pair of adjacent apertures 828, and the circumferential spacing (i.e., the arc length or angular distance measured about central longitudinal axis 808) between each pair of adjacent apertures 828 is the same for each pair of adjacent apertures 828.

Figure 11:
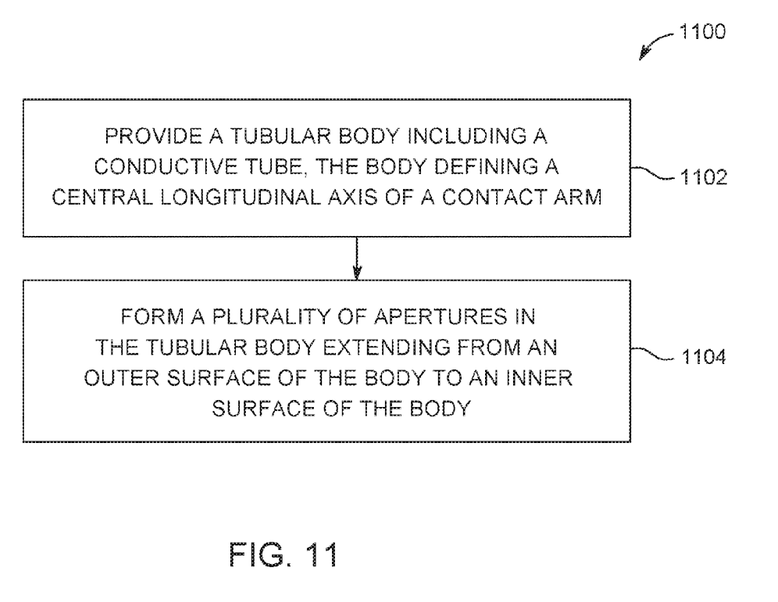
FIG. 11 is a flow chart of an exemplary method of fabricating a circuit breaker contact arm for use in a switchgear circuit breaker.

FIG. 11 is a flow chart of an exemplary method 1100 of fabricating a contact arm for use in a switchgear circuit breaker, such as contact arm 600 (shown in FIGS. 6 and 7) or contact arm 800 (shown in FIGS. 8-10). Referring to FIGS. 6-10, in the exemplary method, a tubular body, such as body 602 (shown in FIG. 6) or body 802 (shown in FIGS. 8-10), is provided 1102 that includes a conductive tube and defines a central longitudinal axis of the contact arm. A plurality of apertures, such as apertures 612 (shown in FIGS. 6 and 7) or apertures 828 (shown in FIGS. 8-10), is formed 1104 in the tubular body extending through the body from an outer surface of the body to an inner surface of the body. In some embodiments, the apertures are formed in the tubular body such that the apertures are arranged helically about the central longitudinal axis of the contact arm. In some embodiments, at least one aperture is formed that extends along a longitudinal axis that is oriented substantially perpendicular to the central longitudinal axis of the body. In some embodiments, at least one aperture is formed that extends along a longitudinal axis that is oriented at an oblique angle with respect to the central longitudinal axis of said body.

In some embodiments, method 1100 further includes enclosing at least a portion of the conductive tube with an insulating layer. In such embodiments, forming 1104 the plurality of apertures includes forming the plurality of apertures through both the insulating layer and the conductive tube.

Experimental Examples

Temperature Rise Tests were conducted using different types of contact arms to compare the heat dissipation performance of each contact arm. The Temperature Rise Tests were conducted using a three-phase circuit breaker having a configuration substantially similar to the configuration of circuit breaker 104 shown and described above with reference to FIG. 2. The circuit breaker included three poles, referred to in the experimental data as Pole A, Pole B, and Pole C, respectively, and six contact arms. Each pole was electrically coupled to two contact arms.

The circuit breaker poles were subjected to identical loading over a pre-determined time period to measure the heat dissipation performance of contact arms used with each circuit breaker pole. Temperature data were collected at nine different locations on each circuit breaker pole over the pre-determined time period. The change in temperature over the pre-determined time period was recorded in Kelvin (K) at each of the nine different locations. Specifically, with reference to FIG. 2, temperature data were collected at an upper cluster contact 1, at a connection 2 between the upper cluster contact and an upper contact arm, at a connection 3 between the upper contact arm and the circuit breaker pole, at an upper portion 4 of the circuit breaker pole, at a lower cluster contact 5, at a connection 6 between the circuit breaker pole and a lower contact arm, at a moveable rod 7 within the circuit breaker pole, at a flexible connection 8 between the circuit breaker pole and a lower contact arm, and at a connection 9 between the lower cluster contact and the lower contact arm.

A first Temperature Rise Test was conducted to establish a baseline heat dissipation performance. In the first Temperature Rise Test, each contact arm used in the circuit breaker had the configuration of contact arm 300 shown and described above with reference to FIG. 3.

A second Temperature Rise Test was conducted to compare the heat dissipation performance of contact arms 400, 600, and 800 shown and described above with reference to FIGS. 4-10 with contact arm 300. In the second Temperature Rise Test, two contact arms having the configuration of contact arm 400 shown and described above with reference to FIGS. 4 and 5 were coupled to circuit breaker Pole A, two contact arms having the configuration of contact arm 600 shown and described above with reference to FIGS. 6 and 7 were coupled to circuit breaker Pole B, and two contact arms having the configuration of contact arm 800 shown and described above with reference to FIGS. 8-10 were coupled to circuit breaker Pole C.

Each contact arm used in the Temperature Rise Tests included an aluminum conductive tube having a total length of 133 millimeters (mm), and an outer diameter of 55 mm. The conductive tube of each contact arm was covered by a 3 mm thick insulating layer.

Results of the Temperature Rise Tests are provided below in Table I.

As indicated by Table I, contact arms having the configuration of contact arm 800 shown and described above with reference to FIGS. 8-10 demonstrated the best heat dissipation performance. In particular, the circuit breaker pole having contact arms with the configuration of contact arm 800 had an average temperature rise of 1.07 K less than the circuit breaker pole having contact arms with the configuration of contact arm 300 shown and described above with reference to FIG. 3. The circuit breaker pole having contact arms with the configuration of contact arm 400 had an average temperature rise of 0.31 K less than the circuit breaker pole having contact arms with the configuration of contact arm 300. The circuit breaker pole having contact arms with the configuration of contact arm 600 had an average temperature rise of 0.73 K less than the circuit breaker pole having contact arms with the configuration of contact arm 300.

Without being bound by any particular theory, it is believed that the improved heat dissipation performance of contact arm 800 as compared to contact arm 300 is attributable to the helical arrangement of apertures in contact arm 800. In particular, it is believed that the helical arrangement of apertures facilities dissipation of thermal energy generated by contact arm 800 by creating a whirlwind or vortex air flow effect between interior 814 of contact arm 800 (shown in FIGS. 9 and 10) and an exterior of contact arm 800, thereby enhancing heat transfer between interior 814 of contact arm 800 and the exterior of contact arm 800.

TABLE 1

Results of Temperature Rise Tests

| | Test I Temperature rise (K) | | | Test II Temperature rise (K) Pole | | | Difference in Measured Temperature Rise between Test I and Test II (K) | | |
|---|---|---|---|---|---|---|---|---|---|
| | A | B | C | A | B | C | A | B | C |
| Contact arm tested | 300 | 300 | 300 | 400 | 600 | 800 | 300/400 | 300/600 | 300/800 |
| 1 Upper cluster contact | 62.73 | 61.23 | 62.83 | 63.80 | 61.80 | 62.30 | −1.07 | −0.57 | 0.53 |
| 2 Connection between cluster contact and contact arm (upper) | 62.73 | 61.93 | 62.83 | 63.60 | 62.30 | 62.60 | −0.87 | −0.37 | 0.23 |
| 3 Connection between contact arm and pole (upper) | 62.93 | 61.23 | 62.73 | 62.90 | 61.10 | 62.90 | 0.03 | 0.13 | −0.17 |
| 4 Upper portion of pole | 64.43 | 62.73 | 64.13 | 63.60 | 61.70 | 62.50 | 0.83 | 1.03 | 1.63 |
| 5 Lower cluster contact | 58.27 | 59.67 | 58.47 | 57.60 | 58.50 | 57.00 | 0.67 | 1.17 | 1.47 |
| 6 Connection between contact arm and pole (lower) | 60.87 | 61.17 | 60.67 | 60.40 | 60.80 | 59.50 | 0.47 | 0.37 | 1.17 |
| 7 Movable rod | 66.53 | 65.93 | 60.97 | 63.40 | 63.40 | 60.70 | 3.13 | 2.53 | 0.27 |
| 8 Connection between movable rod and contact arm (lower) | 62.23 | 64.13 | 64.93 | 63.80 | 62.40 | 62.00 | −1.57 | 1.73 | 2.93 |
| 9 Connection between cluster contact and contact arm (lower) | 60.13 | 60.33 | 59.13 | 59.00 | 59.80 | 57.60 | 1.13 | 0.53 | 1.53 |
| Average value for all locations | | | | | | | 0.31 | 0.73 | 1.07 |
| Average value for locations 1-6 | | | | | | | 0.01 | 0.29 | 0.81 |

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A contact arm for use in a circuit breaker, said contact arm comprising:
   a tubular body comprising a conductive tube and defining a central longitudinal axis of said contact arm, said body having a first end configured for connection with a contact of the circuit breaker and a second end configured for connection with a pole of the circuit breaker;
   wherein said body defines a plurality of apertures extending therethrough from an outer surface of said body to an inner surface of said body, wherein said apertures are arranged helically about the central longitudinal axis of said contact arm.

2. A contact arm in accordance with claim 1, wherein each aperture is spaced an equal distance from each adjacent aperture.

3. A contact arm in accordance with claim 1, wherein each aperture extends along a corresponding longitudinal axis from said outer surface to said inner surface, at least one of said apertures extending along a longitudinal axis that is oriented substantially perpendicular to the central longitudinal axis of said body.

4. A contact arm in accordance with claim 1, wherein each aperture extends along a corresponding longitudinal axis from said outer surface to said inner surface, at least one of said apertures extending along a longitudinal axis that is oriented at an oblique angle with respect to the central longitudinal axis of said body.

5. A contact arm in accordance with claim 4, wherein the oblique angle is in the range of between about 30 degrees and about 60 degrees.

6. A contact arm in accordance with claim 4, wherein each of said apertures has a first opening defined along said outer surface and a second opening defined along said inner surface, at least one of said apertures oriented towards the first end of said body such that the second opening corresponding to said at least one aperture is positioned closer to the first end of said body than the first opening corresponding to said at least one aperture is.

7. A contact arm in accordance with claim 1, wherein each of said apertures has a first opening defined along said outer surface and a second opening defined along said inner surface, wherein the first openings of said apertures are arranged helically about the central longitudinal axis of said contact arm, and the second openings of said apertures are arranged helically about the central longitudinal axis of said contact arm.

8. A contact arm in accordance with claim 1, wherein said body further comprises an insulating layer encircling said conductive tube and enclosing at least a portion of said conductive tube, said insulating layer at least partially defining said outer surface of said body, wherein each of said apertures extends through said insulating layer and said conductive tube.

9. A circuit breaker for use in a switchgear device, said circuit breaker comprising:
   a pole;
   a first contact arm electrically coupled to said pole at a first end of said first contact arm, said first contact arm having a second end electrically coupled to a first contact of said circuit breaker; and
   a second contact arm electrically coupled to said pole at a first end of said second contact arm, said second contact arm having a second end electrically coupled to a second contact of said circuit breaker, at least one of said first contact arm and said second contact arm comprising:
   a tubular body comprising a conductive tube and defining a central longitudinal axis of the respective contact arm, wherein said body defines a plurality of apertures extending therethrough from an outer surface of said body to an inner surface of said body, wherein said apertures are arranged helically about the central longitudinal axis of said contact arm.

10. A circuit breaker in accordance with claim 9, wherein each aperture is spaced an equal distance from each adjacent aperture.

11. A circuit breaker in accordance with claim 9, wherein each aperture extends along a corresponding longitudinal axis from said outer surface to said inner surface, at least one of said apertures extending along a longitudinal axis that is oriented substantially perpendicular to the central longitudinal axis of said body.

12. A circuit breaker in accordance with claim 9, wherein each aperture extends along a corresponding longitudinal axis from said outer surface to said inner surface, at least one of said apertures extending along a longitudinal axis that is oriented at an oblique angle with respect to the central longitudinal axis of said body.

13. A circuit breaker in accordance with claim 9, wherein one of said first contact and said second contact is configured for connection to a bus bar, and the other of said first contact and said second contact is configured for connection to a conductive cable.

14. A circuit breaker in accordance with claim 9, wherein each of said first contact arm and said second contact comprise a tubular body comprising a conductive tube and defining a central longitudinal axis of the corresponding contact arm, wherein said body defines a plurality of apertures extending therethrough from an outer surface of said body to an inner surface of said body, said apertures arranged helically about the corresponding central longitudinal axis.

15. A method of fabricating a contact arm for use in a switchgear circuit breaker, said method comprising:
   providing a tubular body including a conductive tube, the tubular body defining a central longitudinal axis of the contact arm; and
   forming a plurality of apertures in the tubular body helically about the central longitudinal axis of said contact arm and extending from an outer surface of the body to an inner surface of the body.

16. A method in accordance with claim 15, wherein forming the plurality of apertures includes forming at least one aperture extending along a longitudinal axis that is oriented substantially perpendicular to the central longitudinal axis of the body.

17. A method in accordance with claim 15, wherein forming the plurality of apertures includes forming at least one aperture extending along a longitudinal axis that is oriented at an oblique angle with respect to the central longitudinal axis of the body.

18. The contact arm of claim 1, wherein the plurality of apertures are disposed between the first end and the second end.

19. The contact arm of claim 1, wherein the plurality of apertures are in fluid communication with the interior of the conductive tube to enable a flow of air therefrom.

20. The contact arm of claim 9, wherein the plurality of apertures are disposed between the first end and the second end.

21. The contact arm of claim 9, wherein the plurality of apertures are in fluid communication with the interior of the conductive tube to enable a flow of air therefrom.

* * * * *